US012236902B2

(12) United States Patent
Kunkel et al.

(10) Patent No.: US 12,236,902 B2
(45) Date of Patent: Feb. 25, 2025

(54) METADATA-BASED POWER MANAGEMENT

(71) Applicant: DOLBY LABORATORIES LICENSING CORPORATION, San Francisco, CA (US)

(72) Inventors: Timo Daniel Kunkel, Kensington, CA (US); Phillip John Warren, Los Angeles, CA (US); David Lloyd Schnuelle, Pasadena, CA (US)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 0 days.

(21) Appl. No.: 17/916,761

(22) PCT Filed: Apr. 1, 2021

(86) PCT No.: PCT/US2021/025454
§ 371 (c)(1),
(2) Date: Oct. 3, 2022

(87) PCT Pub. No.: WO2021/202927
PCT Pub. Date: Oct. 7, 2021

(65) Prior Publication Data

US 2023/0154418 A1 May 18, 2023

Related U.S. Application Data

(60) Provisional application No. 63/004,019, filed on Apr. 2, 2020.

(30) Foreign Application Priority Data

Apr. 23, 2020 (EP) .................................... 20171001

(51) Int. Cl.
*G09G 3/34* (2006.01)

(52) U.S. Cl.
CPC ..... *G09G 3/3406* (2013.01); *G09G 2320/048* (2013.01); *G09G 2320/062* (2013.01); *G09G 2330/021* (2013.01)

(58) Field of Classification Search
CPC ...... G09G 3/3406; G09G 3/2092; G09G 3/32; G09G 2320/048; G09G 2320/062;
(Continued)

(56) References Cited

U.S. PATENT DOCUMENTS

| | | | |
|---|---|---|---|
| 9,462,326 | B2 | 10/2016 | Raveendran |
| 9,520,079 | B2 | 12/2016 | Fernandes |

(Continued)

FOREIGN PATENT DOCUMENTS

| | | | |
|---|---|---|---|
| EP | 3128506 | A1 | 2/2017 |
| EP | 3200181 | A1 | 8/2017 |
| WO | 2014052956 | A1 | 4/2014 |

*Primary Examiner* — Christopher E Leiby

(57) ABSTRACT

A method and apparatus therefor comprises: receiving an image data and a power metadata, wherein the power metadata includes information relating to a power consumption or an expected power consumption; determining, based on the power metadata, an amount and a duration of a drive modification that may be performed by a target display in response to the power consumption or the expected power consumption; and performing a power management of the target display based on the power metadata to modify a driving of at least one light-emitting element associated with the target display relative to a manufacturer-determined threshold, based on a result of the determining, wherein the power metadata includes at least one of a temporal luminance energy metadata, a spatial luminance energy metadata, a spatial temporal fluctuation metadata, or combinations thereof.

21 Claims, 7 Drawing Sheets

(58) Field of Classification Search
CPC .............. G09G 2320/0613; G09G 2320/0626; G09G 2330/021; G09G 2330/04; G09G 5/10; G09G 2360/16; G09G 2370/04; G09G 2370/10
See application file for complete search history.

(56) References Cited

U.S. PATENT DOCUMENTS

| | | | | |
|---|---|---|---|---|
| 9,629,131 | B2 | 4/2017 | Ozgur | |
| 10,114,440 | B2 | 10/2018 | Chan | |
| 10,154,258 | B2 | 12/2018 | He | |
| 10,165,218 | B2 | 12/2018 | Fernandes | |
| 2014/0285531 | A1 | 9/2014 | Dasher | |
| 2015/0003749 | A1 | 1/2015 | Kim | |
| 2015/0058130 | A1 | 2/2015 | Dharmaji | |
| 2017/0025074 | A1* | 1/2017 | Farrell | G09G 3/36 |
| 2017/0237988 | A1 | 8/2017 | Nogues | |
| 2018/0068637 | A1 | 3/2018 | Ninan | |
| 2018/0192148 | A1 | 7/2018 | Fogelson | |
| 2018/0233075 | A1* | 8/2018 | Boyd | H04N 19/44 |
| 2018/0255350 | A1 | 9/2018 | Rumreich | |
| 2018/0270536 | A1 | 9/2018 | Lefevre | |
| 2018/0284877 | A1 | 10/2018 | Klein | |
| 2018/0286356 | A1 | 10/2018 | Jiang | |
| 2018/0336846 | A1* | 11/2018 | Lee | G09G 3/3406 |
| 2019/0025355 | A1 | 1/2019 | Decamp | |
| 2019/0158855 | A1 | 5/2019 | He | |
| 2019/0280483 | A1 | 9/2019 | Ramamurthy | |
| 2019/0311694 | A1* | 10/2019 | Van Mourik | H04N 9/67 |
| 2022/0044615 | A1 | 2/2022 | Pytlarz | |
| 2022/0270562 | A1* | 8/2022 | Jung | G09G 3/3648 |

* cited by examiner

| Scene or Shot | | 1 – No Significant Highlights | | | | | | | | | | | | | | | 2 – Boostable Highlights | | | | | | | 3 – No Significant Highlights | | | | | | | |
|---|---|---|---|---|---|---|---|---|---|---|---|---|---|---|---|---|---|---|---|---|---|---|---|---|---|---|---|---|---|---|---|
| Frame | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| Source Metadata | OD Countdown | | | | | | 10 | 9 | 8 | 7 | 6 | 5 | 4 | 3 | 2 | 1 | 0 | 0 | 0 | 0 | 0 | 0 | 0 | | | | | | | | |
| | OD Duration | | | | | | 7 | 7 | 7 | 7 | 7 | 7 | 7 | 7 | 7 | 7 | 7 | 6 | 5 | 4 | 3 | 2 | 1 | | | | | | | | |
| Target Metadata | Max Scaler | 1 | 1 | 1 | 1 | 1 | 1 | 1 | 1 | 1 | 1 | 1 | 1 | 1 | 1 | 1 | 1.5 | 1.5 | 1.5 | 1.5 | 1.5 | 1.5 | 1.5 | 1 | 1 | 1 | 1 | 1 | 1 | 1 | 1 |
| | Absolute Max | 1 | 1 | 1 | 1 | 1 | 1 | 1 | 1 | 1 | 1 | 1 | 1 | 1 | 1 | 1 | 1.5 | 1.5 | 1.5 | 1.5 | 1.5 | 1.5 | 1.5 | 1 | 1 | 1 | 1 | 1 | 1 | 1 | 1 |
| SC Status | | Charge | | | | | | | | | | | | | | | Discharge | | | | | | | | | | | | | | |

FIG. 6

METADATA-BASED POWER MANAGEMENT

CROSS-REFERENCE TO RELATED APPLICATION

This application claims priority of the following priority applications: U.S. provisional application 63/004,019, filed 2 Apr. 2020 and EP application 20171001.9, filed 23 Apr. 2020, each of which is incorporation by reference in its entirety.

BACKGROUND

1. Field of the Disclosure

This application relates generally to images; more specifically, this application relates to metadata-based power management in displays.

2. Description of Related Art

As used herein, the term "metadata" relates to any auxiliary information that is transmitted as part of a coded bitstream and that assists a decoder to render a decoded image. Such metadata may include, but are not limited to, color space or gamut information, reference display parameters, and auxiliary signal parameters, as those described herein.

In practice, images comprise one or more color components (e.g., RGB, luma Y and chroma Cb and Cr) where, in a quantized digital system, each color component is represented by a precision of n-bits per pixel (e.g., n=8). A bit depth of n≤8 (e.g., color 24-bit JPEG images) may be used with images of standard dynamic range (SDR), while a bit depth of n≥8 may be considered for images of enhanced dynamic range (EDR) to avoid contouring and staircase artifacts. In addition to integer datatypes, EDR and high dynamic range (HDR) images may also be stored and distributed using high-precision (e.g., 16-bit) floating-point formats, such as the OpenEXR file format developed by Industrial Light and Magic.

Many consumer desktop displays render non-EDR content at maximum luminance of 200 to 300 cd/$m^2$ ("nits") and consumer high-definition and ultra-high definition televisions ("HDTV" and "UHD TV") from 300 to 400 nits. Such display output thus typify a low dynamic range (LDR), also referred to as SDR, in relation to HDR or EDR. As the availability of EDR content grows due to advances in both capture equipment (e.g., cameras) and EDR displays (e.g., the Sony Trimaster HX 31" 4K HDR Master Monitor), EDR content may be color graded and displayed on EDR displays that support higher dynamic ranges (e.g., from 700 nits to 5000 nits or more). In general, the systems and methods described herein relate to any dynamic range.

Regardless of dynamic range, video content comprises a series of still images (frames) that may be grouped into sequences, such as shots and scenes. A shot is, for example, a set of temporally-connected frames. Shots may be separated by "shot cuts" (e.g., timepoints at which the whole content of the image changes instead of only a part of it). A scene is, for example, a sequence of shots that describe a storytelling segment of the larger content. In one particular example where the video content is an action movie, the video content may include (among others) a chase scene which in turn includes a series of shots (e.g., a shot of a driver of a pursuing vehicle, a shot of the driver of a pursued vehicle, a shot of a street where the chase takes place, and so on).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

BRIEF SUMMARY OF THE DISCLOSURE

Various aspects of the present disclosure relate to circuits, systems, and methods for image processing, including metadata-based power management in displays.

In one exemplary aspect of the present disclosure, there is provided a method, comprising: receiving an image data and a power metadata, wherein the power metadata includes information relating to a power consumption or an expected power consumption; determining, based on the power metadata, an amount and a duration of a drive modification that may be performed by a target display in response to the power consumption or the expected power consumption; and performing a power management of the target display based on the power metadata to modify a driving of at least one light-emitting element associated with the target display relative to a manufacturer-determined threshold, based on a result of the determining, wherein the power metadata includes at least one of a temporal luminance energy metadata, a spatial luminance energy metadata, a spatial temporal fluctuation metadata, or combinations thereof.

In another exemplary aspect of the present disclosure, there is provided an apparatus, comprising a display including at least one light-emitting element; and display management circuitry configured to: receive a power metadata, wherein the power metadata includes information relating to a power consumption or an expected power consumption, determine, based on the power metadata, an amount and a duration of a drive modification that may be performed by the display in response to the power consumption or the expected power consumption, and perform a power management of the display based on the power metadata to modify a driving of the at least one light-emitting element relative to a manufacturer-determined threshold, based on a result of the determining, wherein the power metadata includes at least one of a temporal luminance energy metadata, a spatial luminance energy metadata, a spatial temporal fluctuation metadata, or combinations thereof.

In this manner, various aspects of the present disclosure provide for improvements in at least the technical fields of image processing and display, as well as the related technical fields of image capture, encoding, and broadcast.

DESCRIPTION OF THE DRAWINGS

These and other more detailed and specific features of various embodiments are more fully disclosed in the following description, reference being had to the accompanying drawings, in which:

FIG. 6 illustrates an exemplary operational timeline in accordance with various aspects of the present disclosure.

DETAILED DESCRIPTION

Figure 1:
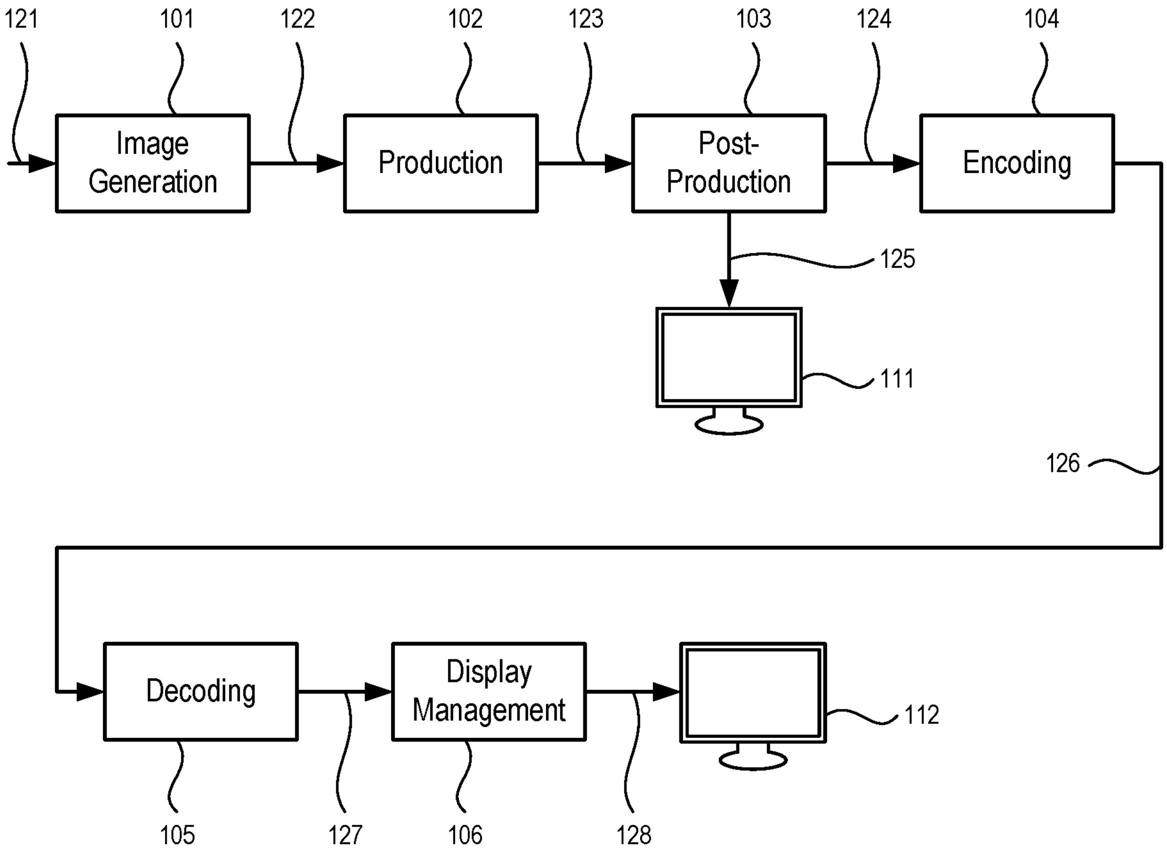
FIG. 1 illustrates an exemplary video delivery pipeline according to various aspects of the present disclosure.

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In the following description, numerous details are set forth, such as spectra, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various elements are used in consumer display systems, it will be understood that this is merely one example of an implementation. It will further be understood that the disclosed systems and methods can be used in any device in which there is a need to display image data; for example, cinema, consumer and other commercial projection systems, smartphone and other consumer electronic devices, heads-up displays, virtual reality displays, and the like.

Overview

Display devices include several components, including light-emitting pixels in self-emissive display technologies such as organic light emitting displays (OLEDs) or plasma display panels (PDPs), or backlights in other display technologies that use transmissive light modulators such as liquid crystal displays (LCDs). In such devices, if various components are driven beyond their technical and physical limitations, the expected behavior such as color rendition might suffer and the failure rate the display system increases. Such driving may result in temporary or permanent component failure. To remedy this, some component manufacturers (often referred to as original equipment manufacturers or OEMs) may limit the technical capabilities by applying operation thresholds. For example, component manufacturers may apply thresholds related to power consumption for components like light emitting diodes (LEDs), LED driver chips, power supplies, and the like. Additionally or alternatively, component manufacturers may apply thresholds related to thermal properties, such as spatial heat propagation through the display chassis.

These thresholds are typically conservative in order to avoid potential public relations or branding issues, such as if a comparatively rare failure is the subject of unflattering press; and to prevent an increase in serve calls to the component manufacturer's support and customer service groups, thus attempting to prevent an increase in cost to the component manufacturer. However, the thresholds may be so conservative that they do not actually approach the technical limits of the display system. Component manufacturers may choose to make the thresholds conservative because content properties that relate to energy consumption are not known ahead of playback in comparative examples. Therefore, energy management parameters in display devices are often assessed in real-time; for example, the signal input may be analyzed at or immediately before display time.

However, if the power consumption that occurs or is expected to occur during content playback is known ahead of time, the power management system in the display device may be able to modify a driving of the display (e.g., adjust the luminance rendering requirements of the content). Some non-limiting examples of adjustments include limiting luminance to conserve power (e.g., if the device is operating on battery power) and/or exceeding the maximum luminance output as determined by the manufacturer-determined safety thresholds if the duration of any such overdrive is known to cause no long-term harm to the display system or its components. These may be referred to as performing an "underdrive" or an "overdrive." In some examples, an assessment of the overdrive (or underdrive) level and duration may be performed during a content production or content delivery process, and then a light-emitting element of the display system may be selectively overdriven (or underdrive) as a result of the assessment.

FIG. 1 illustrates an exemplary video delivery pipeline, and shows various stages from video capture to video content display. Moreover, while the following description is provided in terms of video (i.e., moving images), the present disclosure is not so limited. In some examples, the image content may be still images or combinations of video and still images. The image content may be represented by raster (or pixel) graphics, by vector graphics, or by combinations of raster and vector graphics. FIG. 1 illustrates an image generation block 101, a production block 102, a post-production block 103, an encoding block 104, a decoding block 105, and a display management block 106. The various blocks illustrated in FIG. 1 may be implemented as or via hardware, software, firmware, or combinations thereof. Moreover, various groups of the illustrated blocks may have their respective functions combined, and/or may be performed in different devices and/or at different times. Individual ones or groups of the illustrated blocks may be implemented via circuitry including but not limited to central processing units (CPUs), graphics processing units (GPUs), application-specific integrated circuits (ASICs), field-programmable gate arrays (FPGA), and combinations thereof. The operations performed by one or more of the blocks may be processed locally, remotely (e.g., cloud-based), or a combination of locally and remotely.

As illustrated in FIG. 1, the video delivery pipeline further includes a reference display 111, which may be provided to assist with or monitor the operations conducted at the post-production block, and a target display 112. For explanation purposes, the image generation block 101, the production block 102, the post-production block 103, and the encoding block 104 may be referred to as "upstream" blocks or components, whereas the decoding block 105 and the display management block 106 may be referred to as "downstream" blocks or components.

In the example illustrated in FIG. 1, a sequence of video frames 121 is captured or generated at the image generation block 101. The video frames 121 may be digitally captured (e.g., by a digital camera) or generated by a computer (e.g., using computer animation) to generate video data 122. Alternatively, the video frames 121 may be captured on film by a film camera and then converted to a digital format to provide the video data 122. In either case, the video data 122 is provided to the production block 102, where it is edited to provide a production stream 123.

The video data in the production stream 112 is then provided to a processor or processors at the post-production block 103 for post-production editing. Editing performed at the post-production block 103 may include adjusting or modifying colors or brightness in particular areas of an image to enhance the image quality or achieve a particular appearance for the image in accordance with the video creator's (or editor's) creative intent. This may be referred to as "color timing" or "color grading." Other editing (e.g., scene selection and sequencing, image cropping, addition of computer-generated visual special effects or overlays, etc.) may be performed at the post-production block 103 to yield a distribution stream 124. In some examples, the post-production block 103 may provide an intermediate stream 125 to the reference display 111 to allow images to be viewed on the screen thereof, for example to assist in the editing process. One, two, or all of the production block 102, the post-production block 103, and the encoding block 104 may further include processing to add metadata to the video data. This further processing may include, but is not limited to, a statistical analysis of content properties. The further processing may be carried out locally or remotely (e.g., cloud-based processing).

Following the post-production operations, the distribution stream 124 may be delivered to the encoding block 104 for downstream delivery to decoding and playback devices such as television sets, set-top boxes, movie theaters, laptop computers, tablet computers, and the like. In some examples, the encoding block 104 may include audio and video encoders, such as those defined by Advanced Television Systems Committee (ATSC), Digital Video Broadcasting (DVB), Digital Versatile Disc (DVD), Blu-Ray, and other delivery formats, thereby to generate a coded bitstream 126. In a receiver, the coded bitstream 126 is decoded by the decoding unit 105 to generate a decoded signal 127 representing an identical or close approximation of the distribution stream 124. The receiver may be attached to the target display 112, which may have characteristics which are different than the reference display 111. Where the reference display 111 and the target display 112 have different characteristics, the display management block 106 may be used to map the dynamic range or other characteristics of the decoded signal 127 to the characteristics of the target display 112 by generating a display-mapped signal 128. The display management block 106 may additionally or alternatively be used to provide power management of the target display 112.

The target display 112 generates an image using an array of pixels. The particular array structure depends on the architecture and resolution of the display. For example, if the target display 112 operates on an LCD architecture, it may include a comparatively-low-resolution backlight array (e.g., an array of LED or other light-emitting elements) and a comparatively-high-resolution liquid crystal array and color filter array to selectively attenuate white light from the backlight array and provide color light (often referred to as dual-modulation display technology). If the target display 112 operates on an OLED architecture, it may include a high-resolution array of self-emissive color pixels.

The link between the upstream blocks and the downstream blocks (i.e., the path over which the coded bitstream 126 is provided) may be embodied by a live or real-time transfer, such as a broadcast over the air using electromagnetic waves or via a content delivery line such as fiber optic, twisted pair (ethernet), and/or coaxial cables. In other examples, the link may be embodied by a time-independent transfer, such as recording the coded bitstream onto a physical medium (e.g., a DVD or hard disk) for physical delivery to an end-user device (e.g., a DVD player). The decoder block 105 and display management block 106 may be incorporated into a device associated with the target display 112; for example, in the form of a Smart TV which includes decoding, display management, power management, and display functions. In some examples, the decoder block 105 and/or display management block 106 may be incorporated into a device separate from the target display 112; for example, in the form of a set-top box or media player.

The decoder block 105 and/or the display management block 106 may be configured to receive, analyze, and operate in response to the metadata included or added at the upstream blocks. Such metadata may thus be used to provide additional control or management of the target display 112. The metadata may include image-forming metadata (e.g., Dolby Vision metadata) and/or non-image-forming metadata (e.g., power metadata).

Metadata Generation

As noted above, metadata (including power metadata) may be generated in one or more of the upstream blocks illustrated in FIG. 1. The metadata may then be combined with the distribution stream (e.g., at encoding block 104) for transmission as part of the coded bitstream 126. Power metadata may include temporal luminance energy metadata, spatial luminance energy metadata, spatial temporal fluctuation metadata, and the like.

Temporal luminance energy metadata, as used herein, may include information related to the temporal luminance energy of a particular frame or frames of the image data. For example, the temporal luminance energy metadata may provide a snapshot of the total luminance budget utilized by each content frame. This may be represented as a summation of the luminance values of all pixels in a given frame. In some examples, the above may also be resampled so as to be independent of the resolution of the target display 112 (i.e., to accommodate for 1080p, 2 k, 4 k, and 8 k display resolutions). The temporal luminance energy metadata included within a given frame of the coded bitstream 126 may include information related to future frames. In one example, the temporal luminance energy metadata included within a given frame may include temporal luminance energy information for the following 500 frames. In another example, the temporal luminance energy metadata included within the given frame may include temporal luminance energy information for a larger or smaller number of subsequent frames. Transmission of the temporal luminance energy metadata thus may not be performed for each frame in the coded bitstream 126, but instead may be intermittently transmitted. In some examples, where the temporal luminance energy metadata included within a given frame includes temporal luminance energy for the following N frames, it may be transmitted with the coded bitstream 126 at a period shorter than N (e.g., N/2, N/3, N/4, and so on). The more frequently the temporal luminance energy metadata is transmitted, the more robust the metadata scheme is to latency or other data transmission errors. However, the less frequently the temporal luminance energy metadata is transmitted, the less data bandwidth is used to transmit the metadata. One exemplary relationship between the frequency of metadata transmission and data bandwidth used will be described in more detail below with regard to FIG. 5.

By transmitting the frame-based luminance energy for future frames ahead of time, the display power manager (e.g., the display management block 106) can decide based on the temporal progression of luminance energy how to map the content most effectively to maintain the director's intent while utilizing the hardware capabilities to the fullest. This may include deciding to overdrive (or underdrive) some or all of the light-emitting elements in the end-user display (e.g., the target display 112) for particular scenes or shots, deciding to reduce the luminance of select or all pixels to preserve electrical energy (e.g., from a battery), determining a time period for panel cooldown after a time of intense use or between periods of overdriving, and so on.

Figure 2A:
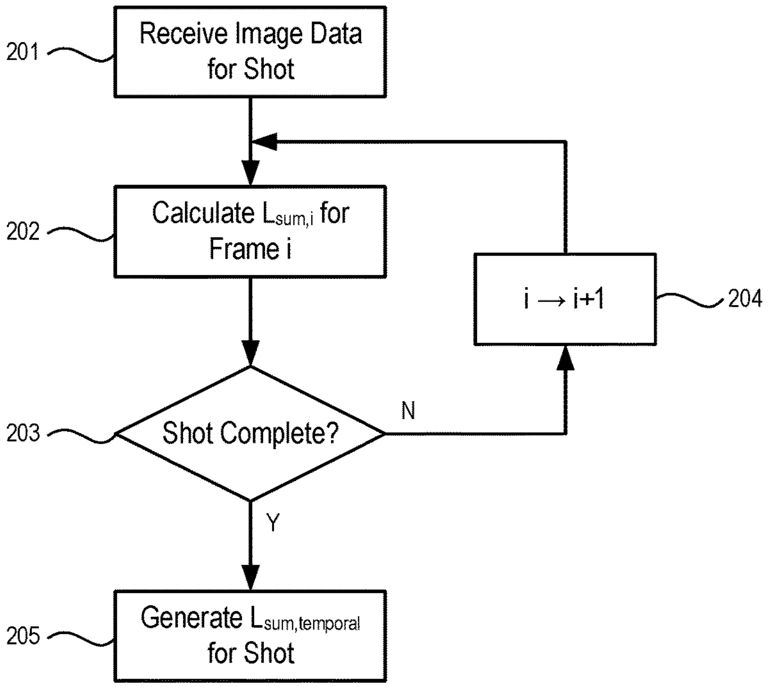
FIGS. 2A-B illustrate an exemplary metadata generation process according to various aspects of the present disclosure.
Figure 2B:
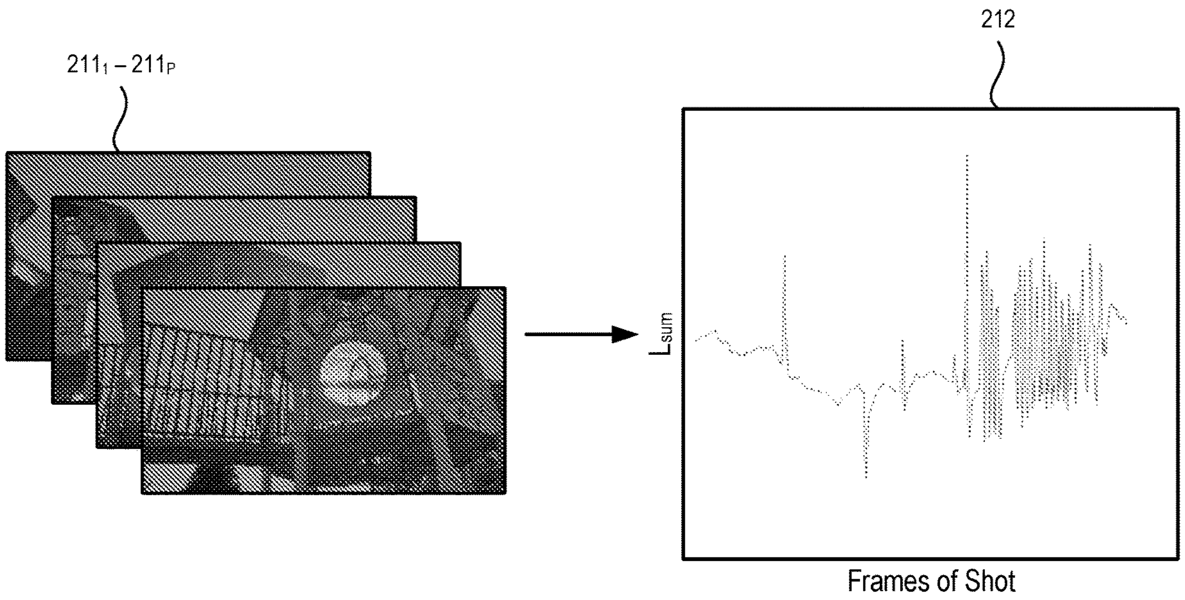

FIGS. 2A-B illustrate an exemplary generation process for temporal luminance energy metadata. FIG. 2A illustrates an exemplary process flow for generating the temporal luminance energy metadata, and FIG. 2B illustrates the exemplary process flow pictorially. The illustrated generation process includes, at operation 201, receiving the image data for a shot of the video content. The shot may include a series of frames, each of which in this example includes image data formed by pixels arranged in a 2-dimensional array. In some applications, each frame may include image data for a stereoscopic display, a multi-view display, a light field display, and/or a volumetric display, in which case the image data may be in a form other than a 2-dimensional array. Subsequently, at operation 202, the quantity $L_{sum,i}$ (i.e., the quantity representing the luminance sum for all pixel luminance levels in a frame) may be calculated for a given frame i (i being initiated to 1 in order to begin with the first frame in the shot) according to the following expression (1):

$$L_{sum,i} = \sum_{x=1}^{n}\sum_{y=1}^{m} L_{xyi} \tag{1}$$

In expression (1) above, x corresponds to the x-coordinate of a pixel in the array, y corresponds to the y-coordinate of a pixel in the array, and $L_{xyi}$ represents the luminance of pixel (x,y) for frame i. In expression (1), each frame includes n×m pixels.

At operation 203, it is determined whether the shot is complete. This may be accomplished by comparing the value i of the current frame to a maximum value P representing the total number of frames in the shot. If it is determined that the shot is not complete, the frame i is incremented by 1 at operation 204 and the process flow returns to operation 202 to calculate the quantity $L_{sum,i}$ for the new frame. If it is determined that the shot is complete, then the quantity $L_{sum,temporal}$ is generated. The quantity $L_{sum,temporal}$ corresponds to the frame-by-frame luminance sum for the entire shot, and may be represented as a one-dimensional data array indicating the quantity $L_{sum,i}$ for each frame i from i=1 to i=P.

FIG. 2B illustrates this pictorially. As inputs, the process receives a plurality of frames of image data $\mathbf{211}_1$ to $211_P$. As outputs, the process provides temporal luminance energy metadata 212 for the shot as a one-dimensional data structure, which is plotted here where the x-axis represents the individual frames and the y-axis represents the frame's spatial luminance sum.

Spatial or temporal luminance energy metadata may include information relating to the total luminance energy of a particular pixel with a particular coordinate xy or pixels of the image data across an entire scene or shot. In some display technologies, excess heat must be transported out of the display housing in order to prevent damage to display device components. For example, in many physical displays the lower center portion of the display exhibits the greatest sensitivity to excessive heat or heat buildup, because the latent energy must travel past a large part of the remaining display panel before it can exit the housing on the top or sides. To avoid problems, many component manufacturers limit the heat buildup by globally (temporally and/or spatially) limiting the luminance output for comparative display systems in which the comparative system's power manager does not have information regarding the luminance requirements at future frames. In the case of spatial luminance energy metadata, by providing an end-user display with spatial luminance energy metadata, the display power manager (e.g., the display management block 106) can decide based on the position and intensity or duration of the pixels how much to drive (or even overdrive or underdrive) the light-emitting elements in the end-user display (e.g., the target display 112).

Figure 3A:
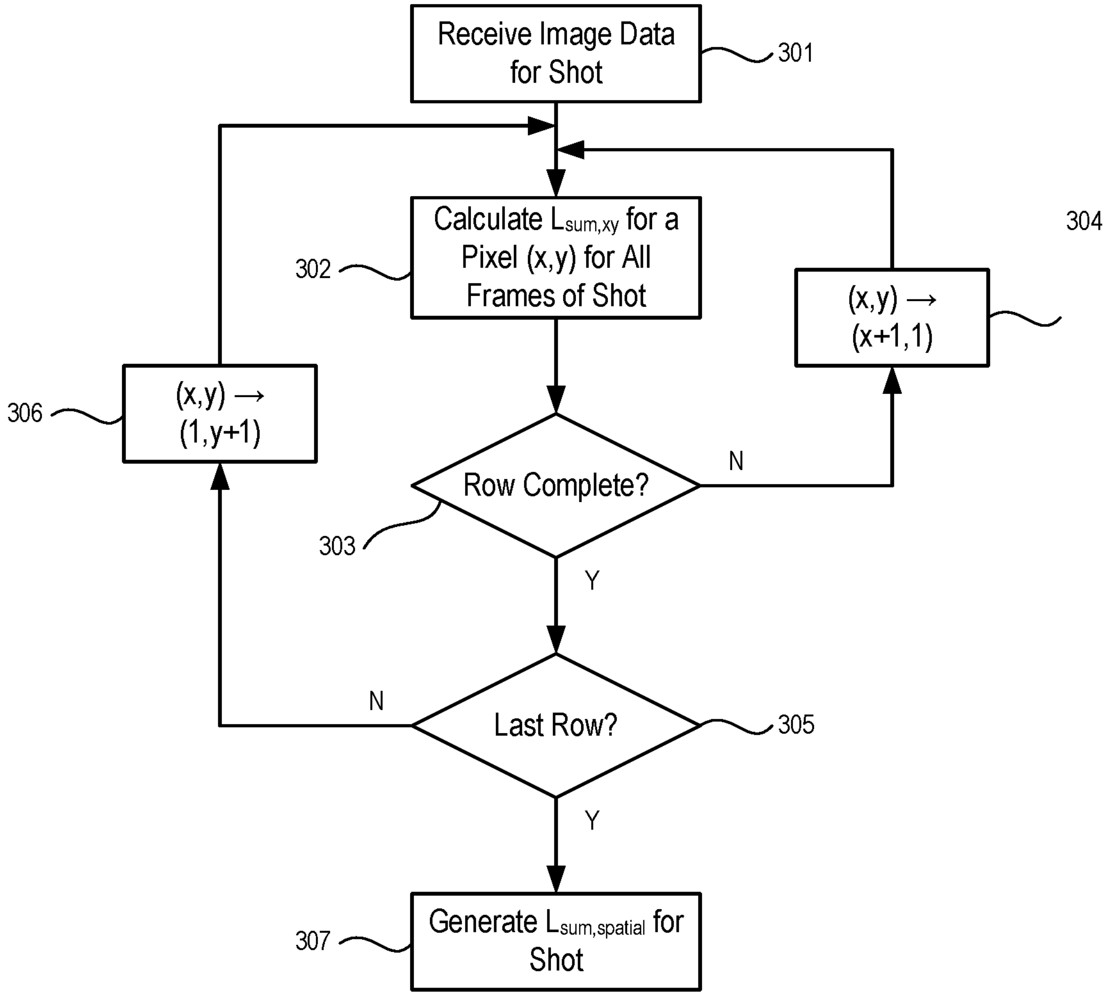
FIGS. 3A-B illustrate another exemplary metadata generation process according to various aspects of the present disclosure.
Figure 3B:
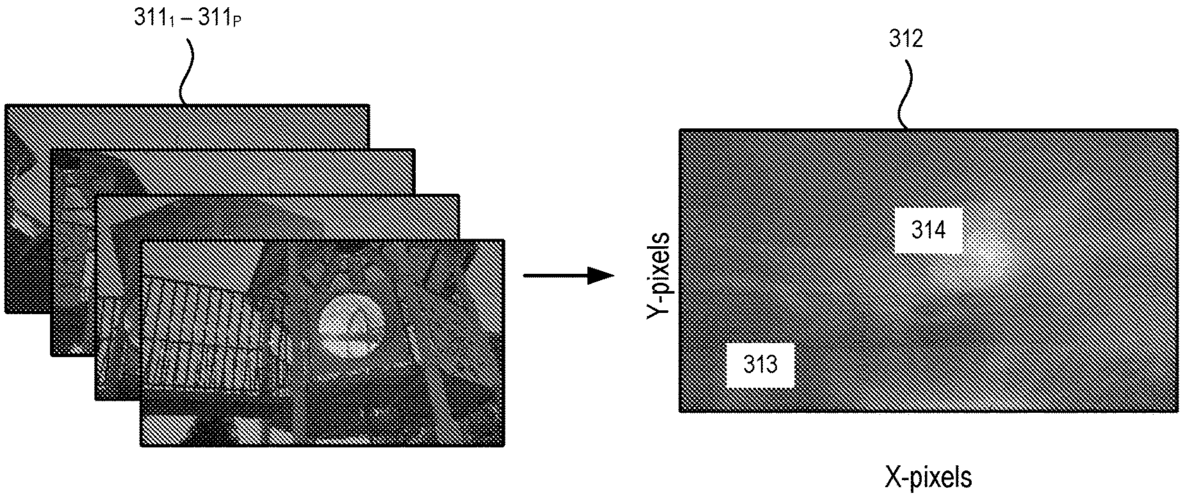

FIGS. 3A-B illustrate an exemplary generation process for spatial luminance energy metadata. FIG. 3A illustrates an exemplary process flow for generating the spatial luminance energy metadata, and FIG. 3B illustrates the exemplary process flow pictorially. The illustrated generation process includes, at operation 301, receiving the image data for a shot of the video content. The shot may include a series of frames, each of which includes image data corresponding to each pixel in a 2-dimensional array. Subsequently, at operation 302, the quantity $L_{sum,xy}$ (i.e., the quantity representing the luminance sum for all frames of a shot, for a given pixel) may be calculated for a given pixel (x, y) (x and y being initiated to 1 in order to begin with the upper left pixel in this example) according to the following expression (2):

$$L_{sum,xy} = \sum_{i=1}^{P} L_{xyi} \tag{2}$$

In expression (2) above, x, y, and $L_{xyi}$ represents the same quantities as described above with reference to expression (1). Operation 302 may be performed repeatedly, incrementing the y coordinate by 1 each iteration until all pixels of the row have been analyzed.

At operation 303, it is determined whether the row of pixels is complete. This may be accomplished by comparing the value x of the current pixel to a maximum value n representing the total number of rows in the array. If it is determined that the row is not complete, the x coordinate of the pixel is incremented by 1 and the y coordinate of the pixel is reinitialized to 1 at operation 304, and the process flow returns to operation 302 to calculate the quantity $L_{sum,xy}$ for the new pixel. If it is determined that the row is complete, then at operation 305 it is determined whether all rows have been analyzed. This may be accomplished by comparing the value y of the current pixel to a maximum value m representing the total number of columns in the array. If it is determined that the row is not the final row, then the x coordinate of the pixel is reinitialized to 1 and the y coordinate of the pixel is incremented by 1 at operation 306, and the process flow returns to operation 302 to calculate the quantity $L_{sum,xy}$ for the new pixel. If it is determined that the row is the final row, then at operation 307 the quantity $L_{sum,spatial}$ is generated. The quantity $L_{sum,spatial}$ corresponds to the frame-by-frame luminance sum for each pixel for the entire shot, and may be represented as a two-dimensional data array indicating the quantity $L_{sum,xy}$ for each pixel.

While FIG. 3A illustrates an exemplary process flow in which the pixels are analyzed on a row-by-row basis beginning with the upper-left pixel (1, 1), in practice the pixels may be analyzed in any order. In some examples, the pixels are analyzed on a row-by-row basis beginning with another corner pixel such as the bottom-right pixel (n, m), the upper-right pixel (1, m), the lower-left pixel (n, 1), or an interior pixel. In other examples, the pixels are analyzed on a column-by-column basis beginning with a corner or interior pixel.

FIG. 3B illustrates the above processes pictorially. As inputs, the process receives a plurality of frames of image data 311$_1$ to $311_P$. As outputs, the process provides spatial luminance energy metadata 312 for the shot as a two-dimensional data structure. In the pictorial illustration of FIG. 3B, dark regions such as region 313 correspond to pixel positions where a lower luminance image element was depicted throughout most or all frames of the shot. This corresponds to a lower luminance energy pixel (e.g., lower energy over the time interval 1 to P). Bright regions such as region 314 correspond to pixel positions where a high luminance image element was depicted throughout most or all frames of the shot. This corresponds to a high luminance energy pixel.

Light-emitting elements which provide illumination for the bright regions (e.g., a backlight LED in an LCD architecture or a group of OLED pixels in an OLED architecture) tend to consume more power and/or to consume power over a longer time if high luminance image parts are present that are also presented at the same part of the display over a prolonged time. In the absence of spatial luminance energy metadata and appropriate management, this may cause stress to components (e.g., the light-emitting elements themselves, drivers, circuit board traces, and the like), latent heat generation that flows upwards and must be removed from the housing, active dimming of pixels or the entire screen, and so on. By providing the target display 112 with spatial luminance energy metadata of a shot prior to the rendering and display of the shot, these problems and/or any component damage may be prevented.

In addition to or as an alternative to calculating the spatial luminance energy metadata, spatial temporal fluctuation metadata may be calculated. The spatial temporal fluctuation metadata may include information relating to the energy fluctuation of a particular pixel or pixels of the image data across an entire scene or shot. For example, a pixel that remains at nearly the same luminance level throughout the scene or shot would have a low degree of energy fluctuation whereas a pixel that varies its luminance level (e.g., to display a bright high-frequency strobe light) would have a high degree of energy fluctuation.

The spatial temporal fluctuation metadata may be calculated by a similar method as illustrated in FIG. 3A, except that at operation 302 the calculation of the quantity $L_{sum,xy}$ may be replaced with a calculation of the quantity $L_{fluct,xy}$ (i.e., the quantity representing the fluctuation for all frames for a given pixel) may be calculated for a given pixel (x, y) (x and y being initiated to 1 in order to begin with the upper left pixel in this example) according to the following expression (3):

$$L_{fluct,xy} = \sum_{i=1}^{P} \sigma(L_{xyi}) \tag{3}$$

In expression (3), σ represents the standard deviation function. In some examples, the spatial luminance energy metadata and the spatial temporal fluctuation metadata may both be calculated at operation 302. In other examples, the process flow of FIG. 3A may be performed twice in series, such that the first process flow calculates the spatial luminance energy metadata and the second process flow calculates the spatial temporal fluctuation metadata (or vice versa).

In some examples, one or both of the skewness ($\tilde{\mu}_3$) and kurtosis ($\tilde{\mu}_4$) of the luminance distribution are calculated. The skewness and/or kurtosis of the luminance distribution may be calculated in addition to or alternative to the standard deviation of the luminance distribution.

Metadata Transmission

Figure 4A:
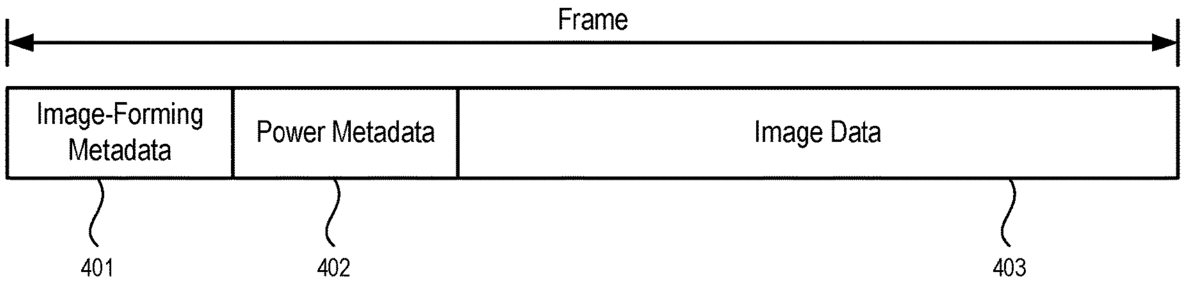
FIGS. 4A-B illustrates exemplary data streams according to various aspects of the present disclosure.

In some implementations, the power metadata described above may be transported as part of the coded bitstream 126, along with actual image data and any additional metadata that may be present. In other implementations, the power metadata may be transported by a different transmission path ("side-loaded") than the actual image data; for example, the power metadata may be transported via TCP/IP, Bluetooth, or another communication standard from the internet or another distribution device. FIG. 4A illustrates one example of a frame of image data in which the power metadata is transported as part of the coded bitstream 126. In this example, the frame of image data includes metadata used for image-forming 401, power metadata 402, and image data 403. The image-forming metadata 401 may be any metadata that is used to render images on the screen (e.g., tone mapping data). The image data 403 includes the actual content to be displayed on the screen (e.g., the image pixels).

As noted above, the power metadata (including temporal luminance energy metadata, spatial luminance energy metadata, spatial temporal fluctuation metadata, and combinations thereof) are types of non-image-forming metadata. In other words, it is possible to render images without the power metadata or with only a partial set of power metadata. Because of this, it is possible to encode less than the full set of power metadata into each and every content frame, in contrast to the case with image-forming metadata that is used to rendering the image accurately. The power metadata may be embedded out of order or in pieces. Moreover, missing portions of the power metadata may be interpolated from present portions of the power metadata or simply ignored without negatively impacting fundamental image fidelity.

Figure 4B:
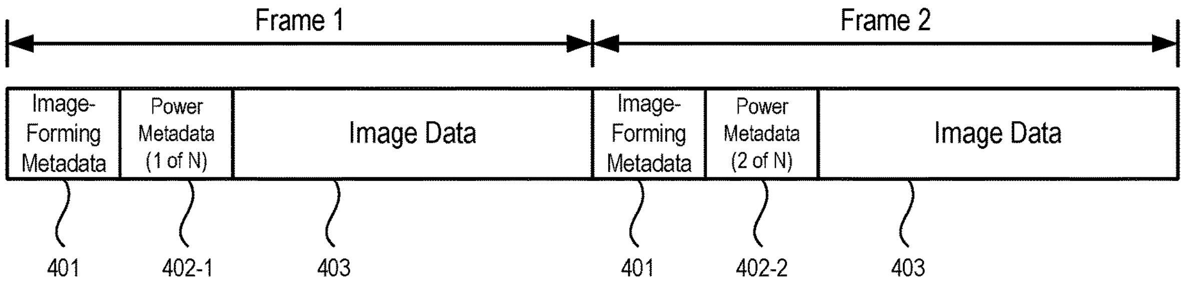

In one example of the present disclosure, the power metadata is segmented and transported (e.g., as part of the coded bitstream 126) in pieces or pages per content frame. FIG. 4B illustrates a series (here, two) of frames of image data in accordance with this operation. In FIG. 4B, each frame includes image-forming metadata 401 and image data 403 corresponding to that frame. Compared with FIG. 4A, however, each frame does not include an entire set of power metadata 402. In this example, the power metadata 402 is divided into N pieces. Thus, the first frame includes a first portion of the power metadata 402-1, a second frame includes a second portion of the power metadata 402-2, and so on until all N portions of the power metadata have been transmitted. The power manager (e.g., the decoding block 105 and/or the display management block 106) may first determine whether power metadata is present for the current frame, scene, or shot, and then operate in response to the determination. For example, if power metadata is not present for the current frame, scene, or shot, the power manager may simply treat the frame, scene, or shot as-is (i.e., not perform any overdriving/underdriving or power consumption mapping). However, if power metadata is present for the current frame, scene, or shot, the power manager may adjust the power consumption and/or mapping behavior of display mapping and/or display hardware (e.g., in the display management block 106 or the target display 112). The power manager may also store any further power metadata (e.g., power metadata for future frames) in a buffer or other memory to derive the preferred mapping strategy. Examples can be power metadata submitted ahead of time, before the actual image frames are rendered and displayed. At the time of playback, the power manager can apply any pre-buffered power metadata to improve the rendering behavior.

The amount of frames (i.e., N) budgeted to transport the power metadata 402 is based on the size of their payload and bandwidth allocation for this particular metadata type. Each piece of the power metadata 402 may not have the same length (i.e., amount of total bytes) as the content's frame interval and thus the rate (bytes/frame) for the power metadata 402 might not be the same as the rate for the image-forming metadata 401. Moreover, in examples where temporal luminance energy metadata, spatial luminance energy metadata, and spatial temporal fluctuation metadata are all implemented, some types of the power metadata may be calculated or derived from other types of the power metadata.

Figure 5:
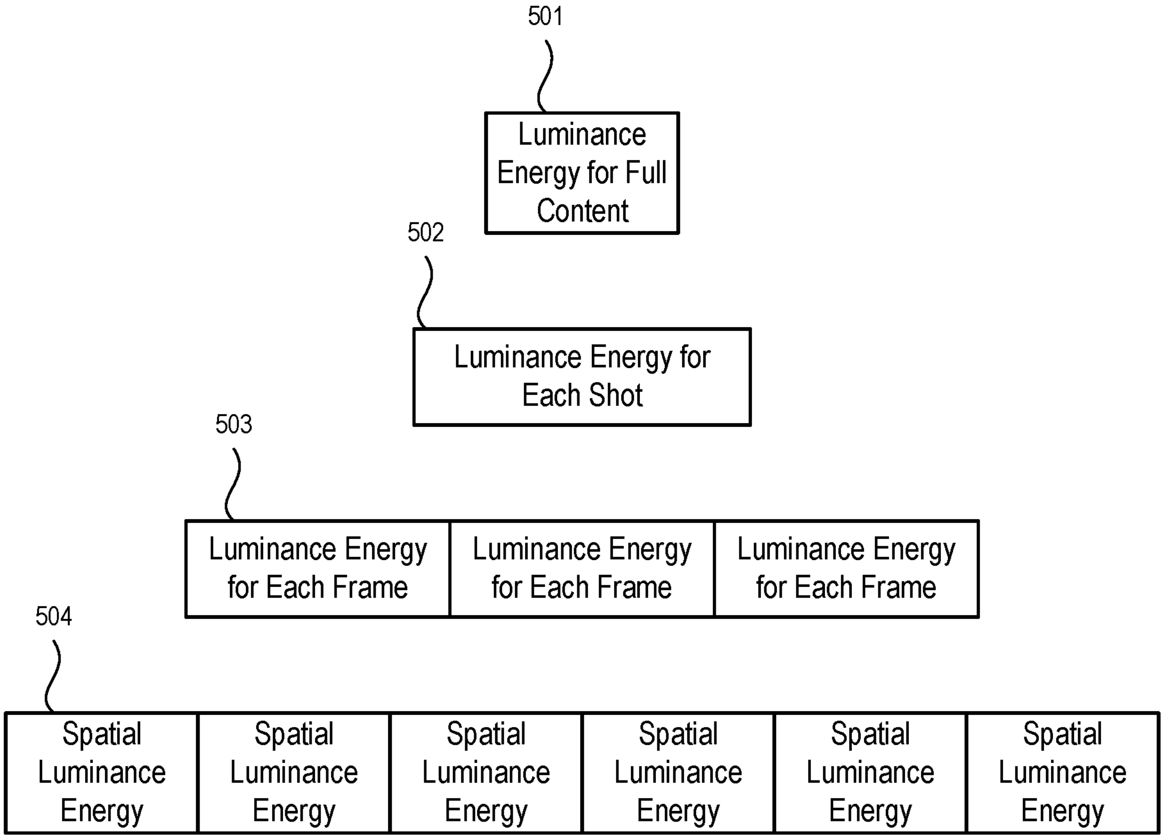
FIG. 5 illustrates an exemplary metadata hierarchy in accordance with various aspects of the present disclosure.

FIG. 5 illustrates an exemplary metadata hierarchy in accordance with various aspects of the present disclosure. The metadata hierarchy has a generally pyramidal form, where higher tiers of the pyramid correspond to coarser metadata (and thus may have a smaller data payload and/or cover a longer time interval of the content) and lower tiers of the pyramid correspond finer metadata (and thus may have a larger data payload and typically cover a shorter time interval of the content). At the top of the pyramid is total luminance metadata 501. The total luminance metadata 501 includes information relating to a luminance energy for the full content (i.e., for many scenes and shots). Because the total luminance metadata 501 describes the full content, its data payload is comparatively tiny. In some examples, the total luminance metadata 501 is a single number representing the sum of all energy levels across all pixels, frames, shots, and scenes. Beneath the total luminance metadata 501 is shot luminance metadata 502. The shot luminance metadata 502 includes information relating to a luminance energy for each full shot. The data payload of the shot luminance metadata 502 is larger than the data payload of the total luminance metadata, but is still small in absolute terms. In some examples, the shot luminance metadata 502 is a one-dimensional data array where each value in the array describes a total luminance for an entire shot. In this example, if the content includes N shots, the shot luminance metadata 502 is a one-dimensional data array of length N.

The next tier is temporal luminance energy metadata 503. The temporal luminance energy metadata 503 includes information relating to a luminance energy for each frame in a shot. Thus, each block of the temporal luminance energy 503 may correspond to the temporal luminance energy metadata 212 described above with regard to FIG. 2B. The data payload of the temporal luminance energy metadata 503 is larger than the data payload of the shot luminance metadata 502, and is much larger than the data payload of the total luminance metadata 501.

The bottom tier is spatial luminance energy metadata 504. The spatial luminance energy metadata 504 includes information relating to a luminance energy for each pixel over the duration of an individual shot. Thus, each block of the spatial luminance energy metadata may correspond to the spatial luminance energy metadata 312 described above with regard to FIG. 3B. Of all the metadata categories illustrated in FIG. 5, the spatial luminance energy metadata 504 has the largest payload. In some examples, the spatial luminance energy metadata 504 may be segmented into pieces (e.g., in a manner as illustrated in FIG. 4B).

There may be an inverse relationship between the data payload and the transmission frequency for a given type of metadata. Moreover, there may be an inverse relationship between the data payload and the proximity to the actual image data described by a given type of metadata. For example, because the total luminance metadata 501 has a very small data payload (e.g., a single number), it may be repeated in the coded bitstream 126 very often and might not be transmitted very near the image frames described therein. Because the shot luminance metadata 502 has a small data payload, it may be repeated in the coded bitstream 126 often but less often than the total luminance metadata 501 and similarly might not be transmitted very near the image frames described therein. Moreover, in some examples, the shot luminance metadata 502 may only describe a subset of the total number of shots, with shot luminance metadata 502 corresponding to earlier shots being transmitted prior to shot luminance metadata 502 corresponding to later shots.

In some examples, only some types of metadata are directly calculated and other types of metadata are derived therefrom. For example, the temporal luminance energy metadata 503 may be calculated (e.g., in a manner as described above with regard to FIG. 3A). Subsequently, the shot luminance metadata 502 may be derived from the temporal luminance energy metadata 503 by, for example, summing each frame luminance value over all frames in the shot. In some examples, the total luminance metadata 501 may then be derived from the shot luminance metadata 502 by, for example, summing each shot luminance value over all shots in the content. The derivations may be performed in the upstream blocks illustrated in FIG. 1 and transmitted as part of the coded bitstream 126, or may be performed in the downstream blocks illustrated in FIG. 1.

As an alternative to or in addition to repeating significant power metadata in a predetermined order and/or at predetermined intervals, other transmission ordering may be implemented. For example, if the content is submitted as a 1:1 stream, the power metadata may be dynamically added to the content stream and may be dynamically adjusted by the playout server (e.g., one or more of the upstream blocks illustrated in FIG. 1). In this configuration, it may be possible to transmit more highly relevant portions of the power metadata earlier or more often, which may provide additional robustness to transmission errors and may facilitate display where an end-user chooses to jump through the content or begin content partway through. This may also be used to adjust the power consumption of a group of associated target devices, for example to maintain a given maximum power budget where several target displays receive power from a common source.

Power Management

Upon receipt of the coded bitstream 126, the downstream blocks illustrated in FIG. 1 may implement power management based on the power metadata received. To facilitate power management, certain metadata flags may be included and frame-synced in order to pre-signal power management events. For example, where the power metadata indicates a backlight (or pixel) overdrive, the power manager can receive a timed pre-notification regarding an upcoming boostable event. FIG. 6 illustrates an exemplary operational timeline for implementing such power management. As will be understood and appreciated by the skilled person, such example may analogously or similarly be applied to power management of underdriving some (or all) of the backlights (or pixels).

In the example illustrated in FIG. 6, a content includes three shots. The first shot includes no significant highlights and has a duration of fifteen frames, the second shot includes boostable highlights and has a duration of seven frames, and the third shot includes no significant highlights and has a duration of eight frames. The source metadata (e.g., the power metadata received by the power manager as part of the coded bitstream 126) includes a first flag data indicating a frame countdown to the next overdrive (OD) request and a second flag data indicating a frame duration of the overdrive request. As illustrated in FIG. 6, the first flag data begins at frame 6 and indicates that the next overdrive request will begin at frame 16, and the second flag data also begins at frame 6 and indicates that the next overdrive request will last for seven frames.

In some examples, the power receiver continually outputs target metadata (e.g., the power metadata that will be received and used by the target display 112). The target metadata may include a first target flag data indicating the maximum scaled luminance for a given frame, where 1 indicates no overdriving, and a second target flag data indicating the absolute maximum luminance at the shot's average picture level (APL). While the maximum scaled luminance and the absolute maximum luminance are the same in the particular example illustrated in FIG. 6, the present disclosure is not so limited. In FIG. 6, the first and second target flag data indicates no overdriving for frame 1 to frame 15 (i.e., for shot 1), indicates 50% overdriving for frame 16 to frame 22 (i.e., for shot 2), and indicates no overdriving for frame 23 to frame 30 (i.e., shot 3).

The power receiver may further output data regarding a charge status of supercapacitors or other fast-discharging energy storage device, in the event that the target display 112 implements supercapacitors or other such devices to overdrive (or underdrive) one or more light-emitting elements. Where the energy storage devices are supercapacitors, this data instructs the target display 112 to begin charging the supercapacitors at a particular time such that the supercapacitors will be sufficiently charged when overdriving is scheduled to begin. In some examples, the data may instead instruct the target display 112 to charge the supercapacitors well in advance of the overdrive request and maintain the charge state until a discharge request is received, indicating that the light-emitting elements are to be overdriven. In some examples, the target display 112 itself may determine how far in advance to begin charging the supercapacitors. As will be understood and appreciated by the skilled person, the above examples of overdriving one or more light-emitting elements (e.g., by charging the supercapacitors well in advance) may analogously or similarly applied to underdriving the one or more light-emitting elements, e.g., by discharging the supercapacitors, or the like.

Power metadata (e.g., the source metadata and/or the target metadata described above) may be stored in a buffer or other memory associated with one or more of the downstream blocks illustrated in FIG. 1. For example, the power metadata may be stored in a buffer or other memory provided in the target display 112 itself. This allows for ordering schemes in which portions of the power metadata are received out-of-order and/or ahead of time, and in which the power manager is configured to subsequently reorder or reassemble the portions of the power metadata. When used with transmission schemes which repeat transmission of certain portions of the power metadata, this may provide additional robustness against data loss. Thus, even if power metadata is available for only a portion of the full content, power management including overdriving (or underdriving) may still be applied. In some implementations, the power metadata may be stored outside of the target display 112; for example, in a set-top-box or in the cloud.

The buffer may also store a configuration file which describes various setting parameters unique to the target display 112 and its hardware properties. For example, the configuration file may include information about one or more of the following: power consumption specifications including a maximum load of the power supply unit, driver chips, light-emitting elements, and so on; cool-down time of the light-emitting or power electronics (LED drivers, etc.) elements; spatial heat transfer as a function of localized heat generation inside the display housing; a maximum overdrive duration of the display, which may be a function of the overdrive level; the presence of supercapacitors and, if present, their capacity, depletion rate, and charge rate; and the like. The configuration file may also be wholly or partly updateable, for example to implement a usage counter and thereby provide information regarding the age or level of wear of the display. In some examples, one or more ambient condition sensors (e.g., temperature sensors, humidity sensors, ambient light sensors, and the like) may be provided to detect corresponding ambient conditions, and information detected by the one or more ambient condition sensors may be stored in or alongside the configuration file to facilitate a determination of the level of wear of the display. This real-time sensor information may also be used to influence the display power management system (e.g., to influence the overdriving or underdriving) to avoid image fidelity artifacts. One example is to avoid underdriving the pixels while the ambient light level is high.

Applications and Effects

The various approaches, systems, methods, and devices described herein may implement power metadata to influence target display behavior in the above described ways without limitation. That is, various aspects of the present disclosure may be used to influence display management mapping behavior (e.g., limiting the luminance output, deviating from the baseline mapping, and the like); to overdrive a backlight unit or (in self-emissive display technologies) the pixels themselves and thereby increase the maximum luminance of individual pixels, pixel groups, or the entire panel beyond overly-conservative manufacturer-set limits, while avoiding excessive taxation on the power supply unit; to increase granularity for display power management systems, for example to manage thermal panel or backlight properties based on spatial and/or temporal power and energy expectations; to provide trim-pass-like behavior and represent luminance levels after the signal has been tone-mapped by the target device, to manage power in multidisplay systems; to intelligently limit display power usage for regulatory (e.g., Energy Star compliance) purposes or power saving (e.g., on battery operated devices); and so on.

A trim pass is a feature which facilitates the human override of the mapping parameters which would otherwise be determined by a computer algorithm (e.g., an algorithm which generates one or more portions of the power metadata). In some examples, the override may be carried out during the color grading process to ensure that a certain look is provided or preserved after determining whether the result of the computer algorithm covers the video or content creator's intent for a particular target display dynamic range bracket (e.g., at a display max of 400 nits). Thus, the power metadata may be updated to include information that would cause the target display to alter or disable the algorithmic recommendation for one or more shots or scenes.

To implement this, the trim-pass-like behavior may be realized by a configuration in which the target display system utilizes the power metadata according to its current playout luminance bracket. If the display maps to a non-default target luminance bracket, the display power management system may be configured to decide the trim-pass accordingly. For example, if the display transitions from a default mapping to a boost mode mapping (e.g., an overdrive), the display power management system may switch from a lower luminance energy trim-pass to a higher one.

In one particular example, during the generation of power metadata the algorithm may indicate that underdriving should be performed for a particular shot. However, underdriving for the particular shot in question may be inadvisable for narrative or other reasons. Therefore, a color grader (human or otherwise) may modify or supplement the power metadata to thereby cause the display power management system to drive (rather than underdrive) the target display, despite the initial output of the algorithm.

Systems and devices in accordance with the present disclosure may take any one or more of the following configurations.

(1) A method, comprising: receiving an image data and a power metadata, wherein the power metadata includes information relating to a power consumption or an expected power consumption; determining, based on the power metadata, an amount and a duration of a drive modification that may be performed by a target display in response to the power consumption or the expected power consumption; and performing a power management of the target display based on the power metadata to modify a driving of at least one light-emitting element associated with the target display relative to a manufacturer-determined threshold, based on a result of the determining, wherein the power metadata includes at least one of a temporal luminance energy metadata, a spatial luminance energy metadata, a spatial temporal fluctuation metadata, or combinations thereof.

(2) The method according to (1) wherein the determining the amount and the duration of the drive modification that may be performed by the target display includes determining an amount and a duration of an overdrive that may be performed by the target display without damaging the at least one light-emitting element, and the performing the power management of the target display includes selectively overdriving the at least one light-emitting element to exceed the manufacturer-determined threshold.

(3) The method according to (1) or (2), wherein the determining the amount and duration of the drive modification that may be performed by the target display includes determining an amount and a duration of an underdrive that may be performed by the target display, in response to the power consumption or the expected power consumption, and the performing the power management of the target display includes reducing a luminance of the at least one light-emitting element.

(4) The method according to any one of (1) to (3), wherein the image data and the power metadata are received together as a coded bitstream.

(5) The method according to (4), further comprising: receiving a first portion of the power metadata in a first frame of the coded bitstream; and storing the first portion of the power metadata in a buffer.

(6) The method according to (5), further comprising: retrieving the first portion of the power metadata from the buffer; and performing the power management of the target display for the image data corresponding to a second frame of the coded bitstream based on the first portion of the power metadata, wherein the second frame is a later image frame compared to the first frame.

(7) The method according to any one of (1) to (6), wherein the image data and the power metadata are received via different transmission paths.

(8) The method according to any one of (1) to (7), wherein the power metadata includes the temporal luminance energy metadata, the method further comprising: deriving a shot luminance metadata from the temporal luminance energy metadata, the shot luminance metadata including information relating to a luminance energy for a shot of the coded bitstream.

(9) The method according to any one of (1) to (8), further comprising: generating a target metadata based on the power metadata, the target metadata including at least one of a first flag data indicating a frame countdown to an overdrive request or a second flag data indicating a frame duration of the overdrive request.

(10) The method according to any one of (1) to (9), wherein performing the power management of the target display includes causing the target display to charge at least one energy storage device associated with the target display.

(11) The method according to any one of (1) to (10), wherein performing the power management of the target display includes causing the target display to discharge at least one energy storage device associated with the target display.

(12) The method according to any one of (1) to (11), further comprising: receiving an image-forming metadata; and controlling the target display to display the image data based on the image-forming metadata.

(13) A non-transitory computer-readable medium storing instructions that, when executed by a processor of a computer, cause the computer to perform operations comprising the method according to any one of (1) to (12).

(14) An apparatus, comprising: a display including at least one light-emitting element; and display management circuitry configured to: receive a power metadata, wherein the power metadata includes information relating to a power consumption or an expected power consumption, determine, based on the power metadata, an amount and a duration of a drive modification that may be performed by the display in response to the power consumption or the expected power consumption, and perform a power management of the display based on the power metadata to modify a driving of the at least one light-emitting element relative to a manufacturer-determined threshold, based on a result of the determining, wherein the power metadata includes at least one of a temporal luminance energy metadata, a spatial luminance energy metadata, a spatial temporal fluctuation metadata, or combinations thereof.

(15) The apparatus according to (14), further comprising a memory configured to store a predetermined configuration file, the predetermined configuration file including information relating to at least one setting parameter of the display.

(16) The apparatus according to (15), wherein the configuration file includes information about at least one of a power consumption specification of the display, a cool-down time of the at least one light-emitting element, a spatial heat transfer of the display, a maximum overdrive duration of the display, or a presence of supercapacitors in the display.

(17) The apparatus according to (15) or (16), wherein the configuration file includes a usage counter indicating information about at least one of an age of the display or a level of wear of the display.

(18) The apparatus according to any one of (15) to (17), further comprising an ambient condition sensor configured to detect an ambient condition, wherein the memory is configured to store information relating to the ambient condition.

(19) The apparatus according to any one of (14) to (18), further comprising: a decoder configured to receive a coded bitstream including an image data and the power metadata, and to provide the power metadata to the display management circuitry.

(20) The apparatus according to (19) wherein: the coded bitstream further includes an image-forming metadata, and the display management circuitry is configured to control the display to modify a display of the image data based on the image-forming metadata.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:

receiving an image data, receiving an image-forming metadata including information relating to rendering images on a screen, and receiving a power metadata including a temporal luminance energy metadata indicating a temporal luminance energy of at least one content frame in a plurality of content frames, a spatial luminance energy metadata indicating a spatial luminance energy of a pixel across the plurality of content frames, and a spatial temporal fluctuation metadata indicating energy fluctuation of the pixel across the plurality of content frames, wherein the power metadata includes information relating to an expected power consumption;

determining, based on the power metadata, an amount and a duration of a drive modification that may be performed by a target display in response to the expected power consumption; and performing a power management of the target display based on the power metadata to modify a driving of at least one light-emitting element associated with the target display relative to a manufacturer-determined threshold, based on a result of the determining.

2. The method according to claim 1, wherein the power metadata included in a frame further includes power metadata for future frames.

3. The method according to claim 1, wherein the determining the amount and the duration of the drive modification that may be performed by the target display includes determining an amount and a duration of an overdrive that may be performed by the target display without damaging the at least one light-emitting element, and the performing the power management of the target display includes selectively overdriving the at least one light-emitting element to exceed the manufacturer-determined threshold.

4. The method according to claim 1, wherein the determining the amount and duration of the drive modification that may be performed by the target display includes determining an amount and a duration of an underdrive that may be performed by the target display, in response to the expected power consumption, and the performing the power management of the target display includes reducing a luminance of the at least one light-emitting element.

5. The method according to claim 1, wherein the image data and the power metadata are received via different transmission paths.

6. The method according to claim 1, further comprising: generating a target metadata based on the power metadata, the target metadata including at least one of a first flag data indicating a frame countdown to an overdrive request or a second flag data indicating a frame duration of the overdrive request.

7. The method according to claim 1, wherein performing the power management of the target display includes causing the target display to charge or discharge at least one energy storage device associated with the target display.

8. The method according to claim 1, further comprising: receiving an image-forming metadata; and controlling the target display to display the image data based on the image-forming metadata.

9. A non-transitory computer-readable medium storing instructions that, when executed by a processor of a computer, cause the computer to perform operations comprising the method according to claim 1.

10. An apparatus, comprising:

a display including at least one light-emitting element; and display management circuitry configured to:

receive a coded bitstream including: an image data, an image-forming metadata, a power metadata, where the power metadata includes information relating to a power consumption or an expected power consumption, determine, based on the power metadata, an amount and a duration of a drive modification that may be performed by the display in response to the power consumption or the expected power consumption, perform a power management of the display based on the power metadata to modify a driving of the at least one light-emitting element relative to a manufacturer-determined threshold, based on a result of the determining, wherein the power metadata includes a temporal luminance energy metadata indicating a temporal luminance energy of a content frame, a spatial luminance energy metadata indicating a spatial luminance energy of a pixel across a plurality of content frames, and a spatial temporal fluctuation metadata indicating energy fluctuation of the pixel across the plurality of content frames.

11. The method according to claim 10, wherein the power metadata included in a single content frame further includes power metadata for future content frames.

12. The apparatus according to claim 10, further comprising a memory configured to store a predetermined configuration file, the predetermined configuration file including information relating to at least one setting parameter of the display.

13. The apparatus according to claim 12, wherein the configuration file includes information about at least one of a power consumption specification of the display, a cool-down time of the at least one light-emitting element, a spatial heat transfer of the display, a maximum overdrive duration of the display, or a presence of supercapacitors in the display.

14. The apparatus according to claim 12, wherein the configuration file includes a usage counter indicating information about at least one of an age of the display or a level of wear of the display.

15. The apparatus according to claim 12, further comprising an ambient condition sensor configured to detect an ambient condition, wherein the memory is configured to store information relating to the ambient condition.

16. The apparatus according to claim 10, further comprising:

a decoder configured to receive the coded bitstream including the image data, the image forming metadata, and the power metadata, and to provide the power metadata to the display management circuitry.

17. The apparatus according to claim 16, wherein the display management circuitry is configured to control the display to modify a display of the image data based on the image-forming metadata.

18. The apparatus of claim 10, wherein the display management circuitry is further configured to receive a first portion of the power metadata in a first frame of the coded bitstream, store the first portion of the power metadata in a buffer, receive a second portion of the power metadata in a second frame of the coded bitstream, store the second portion of the power metadata in the buffer.

19. A method, comprising:

transmitting a coded bitstream including image data and power metadata including information relating to an expected power consumption;

receiving a first portion of the power metadata in a first content frame of the coded bitstream;

storing the first portion of the power metadata in a buffer;

receiving a second portion of the power metadata in a second content frame of the coded bitstream;

storing the second portion of the power metadata in the buffer;

determining, based on the power metadata, an amount and a duration of a drive modification that may be performed by a target display in response to the expected power consumption; and performing a power management of the target display based on the power metadata to modify a driving of at least one light-emitting element associated with the target display relative to a manufacturer-determined threshold, based on a result of the determining, wherein the power metadata includes a temporal luminance energy metadata indicating a temporal luminance energy of a content frame, a spatial luminance energy metadata indicating a spatial luminance energy of a pixel across a plurality of content frames, and a spatial temporal fluctuation metadata indicating energy fluctuation of the pixel across the plurality of content frames.

20. The method according to claim 19, further comprising:

retrieving the first portion of the power metadata from the buffer; and performing the power management of the target display for the image data corresponding to the second frame of the coded bitstream based on the first portion of the power metadata, wherein the second frame is a later image frame compared to the first frame.

21. The method according to claim 19, wherein the power metadata includes the temporal luminance energy metadata, the method further comprising:

deriving a shot luminance metadata from the temporal luminance energy metadata, the shot luminance metadata including information relating to a luminance energy for a shot of the coded bitstream.

* * * * *